(12) United States Patent
Ushiku (10) Patent No.: US 8,311,363 B2
(45) Date of Patent: Nov. 13, 2012

(54) IMAGE PROCESSING APPARATUS, METHOD OF CONTROLLING THE SAME, AND COMPUTER-READABLE STORAGE MEDIUM

(75) Inventor: Toru Ushiku, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 475 days.

(21) Appl. No.: 12/695,303

(22) Filed: Jan. 28, 2010

(65) Prior Publication Data

US 2010/0215288 A1 Aug. 26, 2010

(30) Foreign Application Priority Data

Feb. 23, 2009 (JP) ................................ 2009-039832

(51) Int. Cl.
*G06K 9/36* (2006.01)
(52) U.S. Cl. ........ 382/276; 382/282; 382/305; 358/538; 358/426.05
(58) Field of Classification Search ................... 382/278, 382/282, 305, 307; 358/538, 426.05
See application file for complete search history.

(56) References Cited

U.S. PATENT DOCUMENTS

| 6,919,892 | B1 * | 7/2005 | Cheiky et al. ................. 345/473 |
| 7,006,881 | B1 * | 2/2006 | Hoffberg et al. ................ 700/83 |
| 7,024,046 | B2 * | 4/2006 | Dekel et al. .................... 382/240 |
| 7,805,011 | B2 * | 9/2010 | Klamer et al. ................. 382/232 |
| 7,911,501 | B2 * | 3/2011 | Johnson et al. ............ 348/222.1 |
| 2005/0231739 | A1 | 10/2005 | Lee et al. |
| 2007/0047814 | A1 | 3/2007 | Yamazaki |

FOREIGN PATENT DOCUMENTS

| JP | 4-157976 A | 5/1992 |
| JP | 2007-066188 | 3/2007 |

* cited by examiner

*Primary Examiner* — Yosef Kassa
(74) *Attorney, Agent, or Firm* — Fitzpatrick Cella Harper & Scinto (57) ABSTRACT

This invention provides an image processing apparatus which handles process target image data as data of various kinds of layouts without storing image data of each layout in a memory, a method of controlling the same, and a computer-readable storage medium storing a computer program. To accomplish this, the image processing apparatus creates, from stored image data, output data complying with an output method. If the layout of the stored image data is not appropriate to the output method, the image processing apparatus executes a conversion process of the image data.

9 Claims, 13 Drawing Sheets

IMAGE PROCESSING APPARATUS, METHOD OF CONTROLLING THE SAME, AND COMPUTER-READABLE STORAGE MEDIUM

BACKGROUND OF THE INVENTION

1. Field of the Invention

The present invention relates to an image processing apparatus for outputting image data in accordance with requested output conditions, a method of controlling the same, and a computer-readable storage medium storing a computer program.

2. Description of the Related Art

A current image processing apparatus can process, as process target image data, data received from a personal computer (PC) or the like and data obtained by causing a scanner to read a document image printed on paper. As for the output method, the image processing apparatus has not only a print function but also a transmission function of transmitting data to an external device. That is, the image processing apparatus handles data of different types depending on the process target data input method or output method.

Since the current image processing apparatus needs to handle data of various types, there has been proposed a method of efficiently processing these data. For example, Japanese Patent Laid-Open No. 2007-066188 proposes a document management system which generates separated data of photos, characters, tables, and line arts contained in process target image data, thereby facilitating use and manipulation of the data.

However, this prior art has the following problem. Although the prior art enables to handle data in various formats, data for the processes are stored individually. For example, when transmitting process target image data to a printing apparatus to print or transmitting the image data to a display apparatus to display, data having different formats are stored in a memory or the like depending on the devices of the transmission destinations. That is, the prior art requires a large-capacity memory area to store data having formats corresponding to the devices of the output destinations.

SUMMARY OF THE INVENTION

The present invention enables realization of an image processing apparatus which handles process target image data as data of various kinds of layouts without storing image data of each layout in a memory, a method of controlling the same, and a computer-readable storage medium storing a computer program.

One aspect of the present invention provides an image processing apparatus for outputting image data in accordance with requested output conditions, comprising: a storage unit that stores image data as a target of image processing; a determination unit that, when outputting the image data stored in the storage unit, determines whether an output method included in the output conditions indicates print output or display output, and determines whether or not a layout of the image data stored in the storage unit is appropriate to the determined output method; a conversion unit that, if the determination unit has determined that the layout of the image data stored in the storage unit is not appropriate to the determined output method, converts the image data into a layout appropriate to the determined output method; and a transmission unit that transmits the image data converted by the conversion unit to an output device corresponding to the output method included in the output conditions.

Another aspect of the present invention provides a method of controlling an image processing apparatus for outputting image data in accordance with requested output conditions, the apparatus including a storage unit that stores image data as a target of image processing, comprising: when outputting the image data stored in the storage unit, determining whether an output method included in the output conditions indicates print output or display output, and determining whether or not a layout of the image data stored in the storage unit is appropriate to the determined output method; if it is determined in the determining that the layout of the image data stored in the storage unit is not appropriate to the determined output method, converting the image data into a layout appropriate to the determined output method; and transmitting the image data converted in the converting to an output device corresponding to the output method included in the output conditions.

Still another aspect of the present invention provides a computer-readable storage medium storing a computer program that causes a computer to execute the image processing apparatus control method.

Further features of the present invention will be apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Arrangement of Image Processing System

Figure 1:
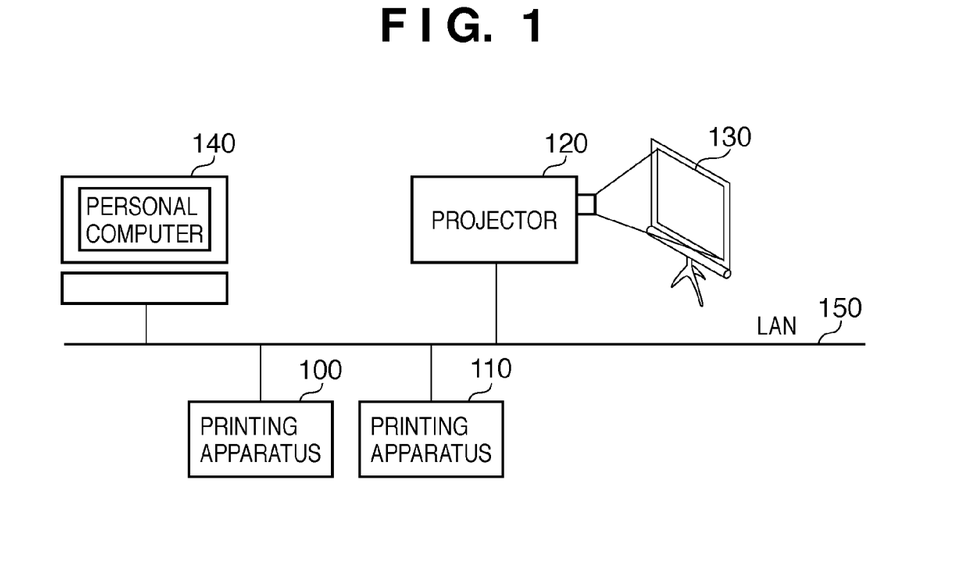
FIG. 1 is a view showing an example of the arrangement of an image processing system according to the first embodiment.

The first embodiment will now be described with reference to FIGS. 1 to 11. FIG. 1 is a view showing an example of the arrangement of an image processing system according to the first embodiment. Note that as an image processing apparatus included in the image processing system, a printing apparatus will be exemplified in FIG. 1. However, the present invention is applicable not only to a printing apparatus but also to any other image processing apparatus such as a copying machine or a facsimile apparatus. A projector for projecting a display image on a screen or a wall will be exemplified as a display apparatus. However, it may be an apparatus for displaying a display image using a monitor or the like.

In the image processing system shown in FIG. 1, a personal computer 140, two printing apparatuses 100 and 110, and a projector 120 serving as a display apparatus are connected to a LAN 150. Reference numeral 130 denotes a screen on which the projector 120 projects an irradiation image. In the image processing system according to the present invention, the number of connected devices is not limited to that in FIG. 1. The LAN 150 is applied here as a connection method. However, the present invention is not limited to this. For example, an arbitrary network such as a WAN (public network), a serial transmission scheme such as a USB, or a parallel transmission scheme such as centronics or SCSI is also applicable. The projector 120 outputs an irradiation image to the screen 130.

The personal computer (to be referred to as a PC hereinafter) 140 has the functions of a general personal computer. The PC 140 can transmit or receive a file or email using the FTP or SMB protocol via the LAN 150 or a WAN. The PC 140 can also send a print instruction to the printing apparatuses 100 and 110 via a printer driver.

The printing apparatus according to this embodiment stores image data received from the PC 140 or image data read from an original using the scanner included in the printing apparatus itself, and converts the image data stored in a memory or the like in accordance with an output condition requested by the operator of the image processing system. That is, in this embodiment, one stored data is converted into various kinds of output data corresponding to output conditions. This obviates the need for storing data corresponding to each layout, and enables effective utilization of the memory resource. Note that the output conditions include, for example, an output method that designates print output or display output, an output size, an output direction indicating "vertical" or "horizontal", and information representing an output destination device.

<Arrangement of Printing Apparatus>

Figure 2:
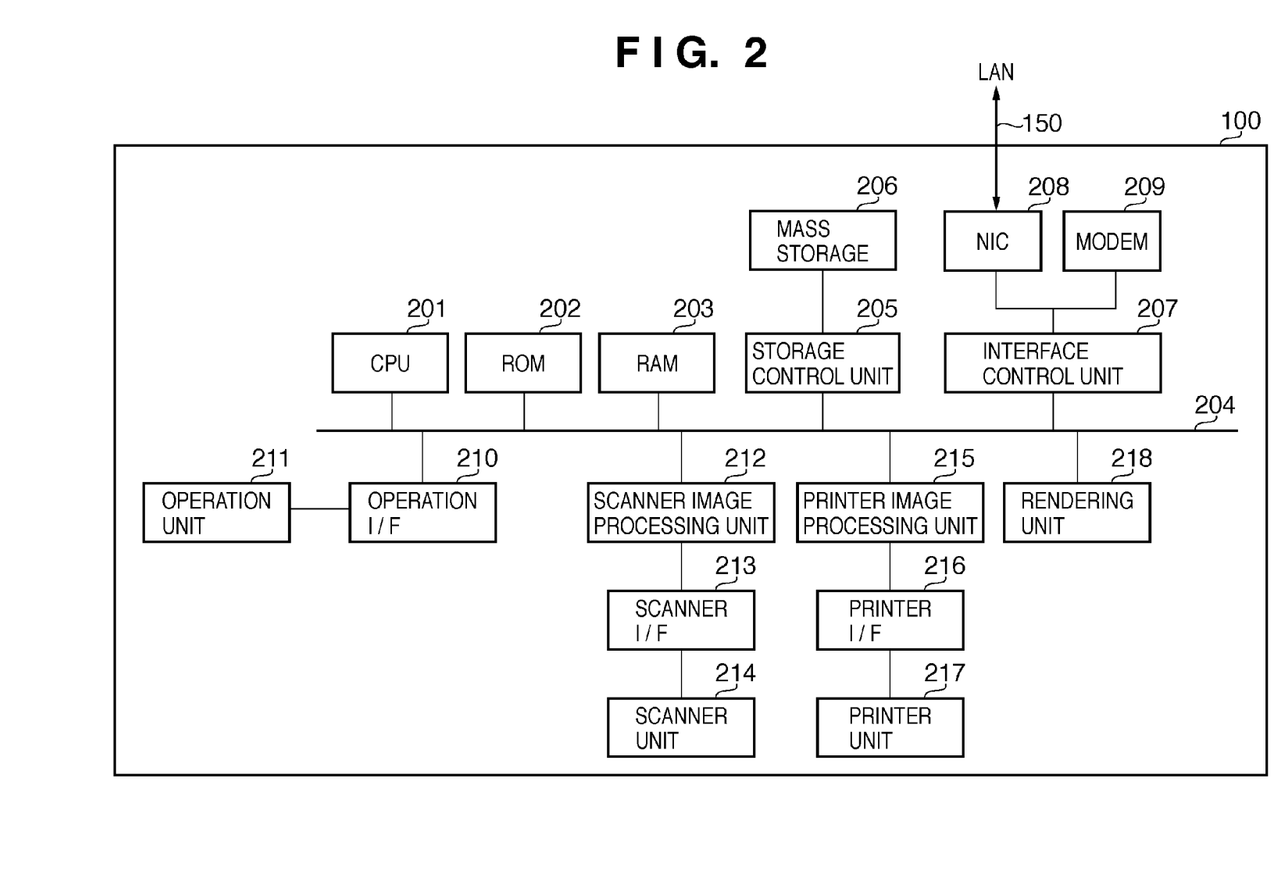
FIG. 2 is a block diagram showing an example of the arrangement of a printing apparatus 100 according to the first embodiment.

The arrangement of the printing apparatus 100 or 110 of this embodiment will be described next with reference to FIG. 2. FIG. 2 is a block diagram showing an example of the arrangement of the printing apparatus 100 according to the first embodiment. The printing apparatus 110 has the same arrangement as that of the printing apparatus 100 to be explained below, and a description thereof will be omitted.

The printing apparatus 100 includes a CPU 201, ROM 202, RAM 203, storage control unit 205, mass storage 206, interface control unit 207, NIC 208, modem 209, operation I/F 210, operation unit 211, scanner image processing unit 212, scanner I/F 213, scanner unit 214, printer image processing unit 215, printer I/F 216, printer unit 217, and rendering unit 218. These blocks are connected via a data bus 204 to enable data communication with each other.

The CPU 201 is a controller configured to control the overall printing apparatus 100. The CPU 201 runs the OS (Operating System) based on a boot program stored in the ROM 202. A controller program and various kinds of application programs stored in the mass storage 206 run on the OS. The RAM 203 serves as a temporary storage area such as the main memory or work area of the CPU 201. The RAM 203 is also used as a temporary storage area for image processing.

The interface control unit 207 controls a network I/F such as the NIC (Network Interface Card) 208 to transmit/receive various data such as image data to/from a network such as the LAN 150. The interface control unit 207 also controls the modem 209 to transmit/receive data to/from a telephone line.

The operation I/F 210 inputs a user's operation instruction from the operation unit 211 such as a touch panel or a hard key. The operation I/F 210 also controls the operation unit 211 such as an LCD or a CRT to display an operation window for the user.

The scanner image processing unit 212 corrects, manipulates, and edits image data received from the scanner unit 214 via the scanner I/F 213. Note that the scanner image processing unit 212 determines whether the received image data is, for example, a color original or a monochrome original, or a character original or a photo original. The determination results are added to the image data. The additional information will be referred to as attribute data hereinafter.

The printer image processing unit 215 performs image processing for print output, thereby generating bitmap data. The printer image processing unit 215 then transmits the bitmap data to the printer unit 217 via the printer I/F 216. The printer unit 217 executes print processing for a printing material such as a paper sheet in accordance with the received bitmap data output via the printer I/F 216.

The rendering unit 218 generates bitmap data representing a print image. Image data transmitted from the PC 140 is input to the printing apparatus 100 via the LAN 150. The input image data is converted into output data by the CPU 201 and then sent to the rendering unit 218. The rendering unit 218 interprets the output data converted by the CPU 201, thereby generating bitmap data.

<Arrangement of Projector>

Figure 3:
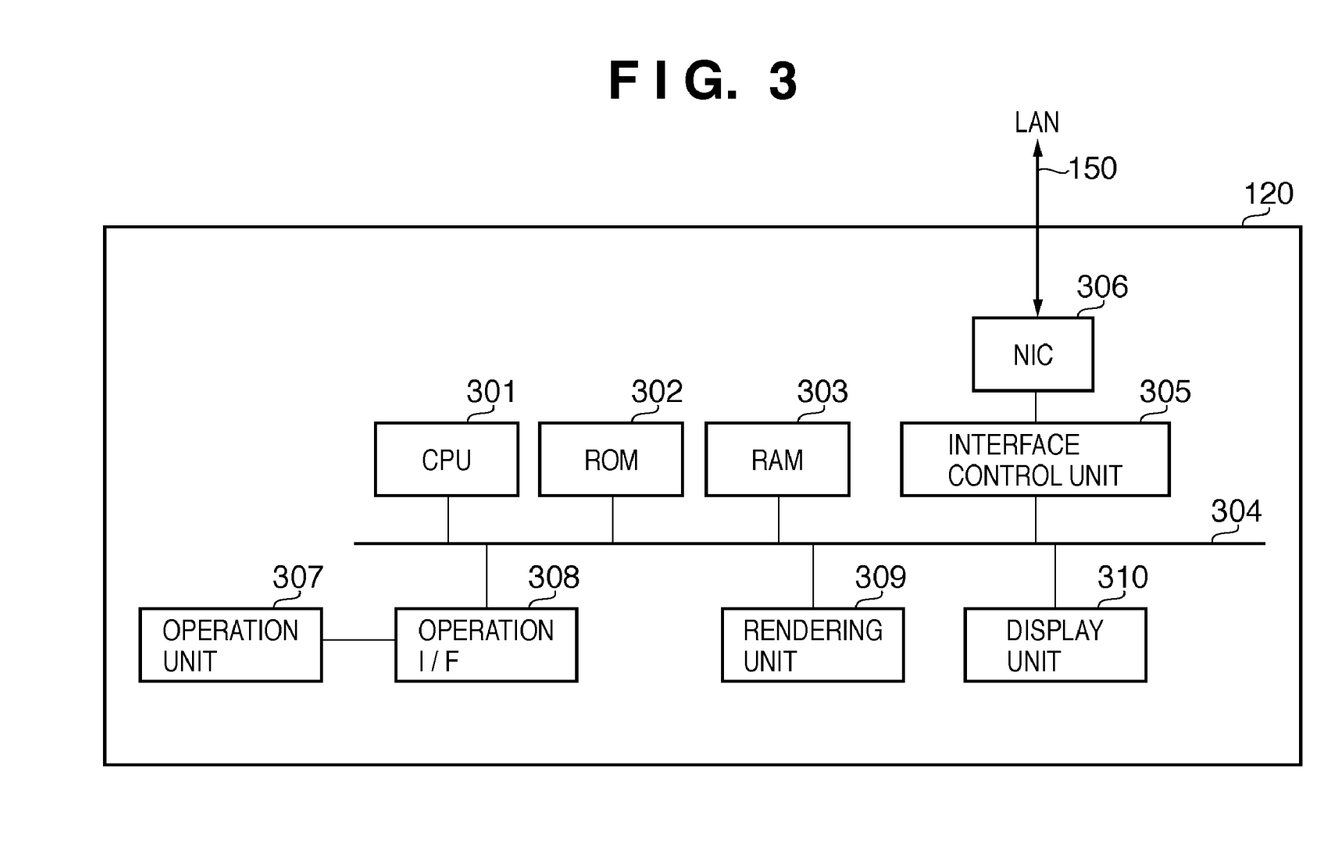
FIG. 3 is a block diagram showing an example of the arrangement of a projector 120 according to the first embodiment.

The arrangement of the projector of this embodiment will be explained next with reference to FIG. 3. FIG. 3 is a block diagram showing an example of the arrangement of the projector 120 according to the first embodiment.

The projector 120 includes a CPU 301, ROM 302, RAM 303, interface control unit 305, NIC 306, operation unit 307, operation I/F 308, rendering unit 309, and display unit 310. These blocks are connected via a data bus 304 to enable data communication with each other.

The CPU 301 is a controller configured to control the overall projector 120. The CPU 301 runs the OS (Operating System) based on a boot program stored in the ROM 302. A control program and various kinds of applications run on the OS. The RAM 303 serves as a temporary storage area such as the main memory or work area of the CPU 301. The RAM 303 is also used as a temporary storage area for image processing.

The interface control unit 305 controls a network I/F such as the NIC (Network Interface Card) 306 to transmit/receive various data such as image data to/from a network such as a LAN. The operation I/F 308 inputs a user's operation instruction from the operation unit 307 such as a hard key or a remote controller. The operation I/F 308 also controls the display unit 310 to display an operation window on the screen 130.

The rendering unit 309 generates bitmap data representing a display image. Note that the rendering unit 309 interprets output data received via the NIC 306, thereby generating bitmap data. The display unit 310 irradiates the screen 130 with the bitmap data generated by the rendering unit 309.

According to the embodiment, data to be input to the projector 120 include image data from the PC 140 and image data the scanner unit 214 of the printing apparatus 100 or 110 reads from an original. These image data are first stored in a storage device (RAM 203 or mass storage 206) in the printing apparatus 100 or 110. The printing apparatus 100 or 110 creates output data in accordance with a print condition to print the image data on a paper sheet or a display request from the projector.

The above-described image data from the PC 140 is intermediate data obtained by interpreting a PDL (Page Description Language) transmitted from the PC 140. The image data from the scanner unit 214 is intermediate data generated by receiving, via the scanner I/F 213, image data read by the scanner unit 214, causing the scanner image processing unit 212 to divide the image data into attributes such as character, photo, table, and line image, and converting the data into a format common to intermediate data, that is, image data from the PC 140.

<Output Data Generation Method>

Figure 4:
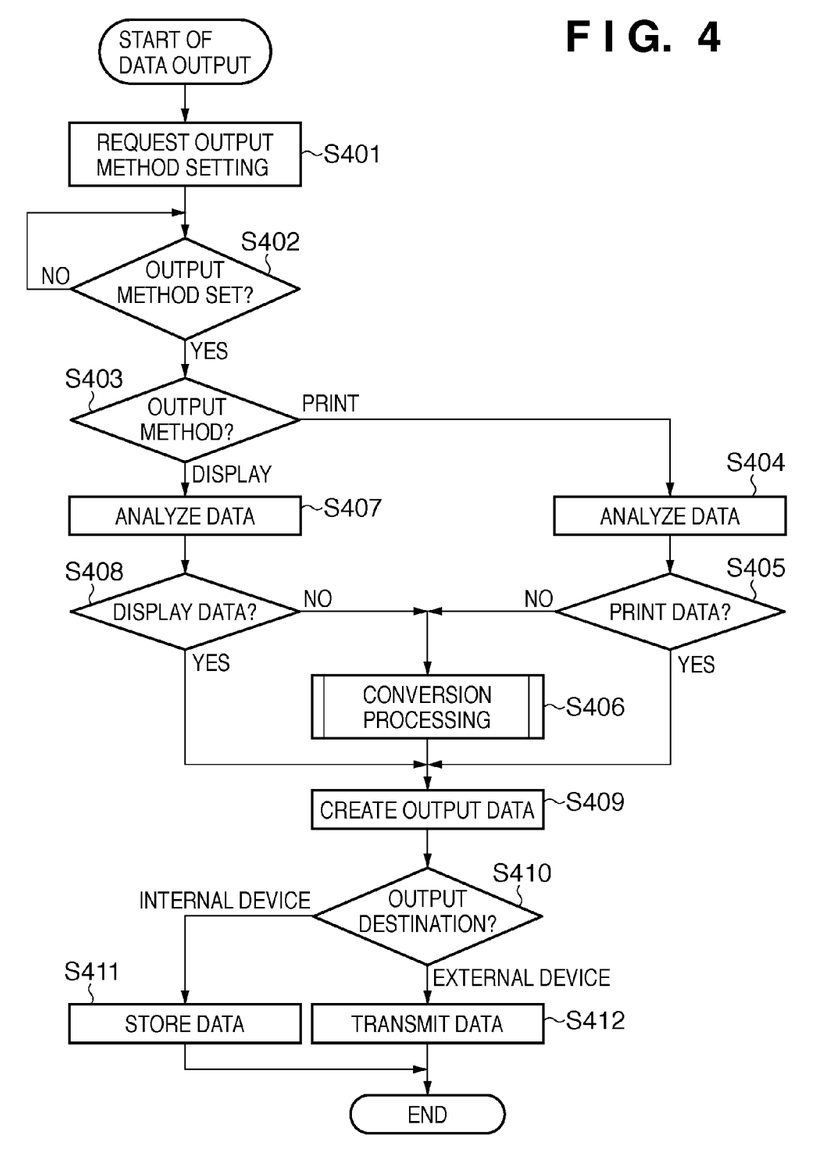
FIG. 4 is a flowchart illustrating an output data generation procedure according to the first embodiment.

An output data generation method of this embodiment will be described next with reference to FIGS. 4 to 9. FIG. 4 is a flowchart illustrating an output data generation procedure according to the first embodiment. This flowchart assumes that an output request is transmitted to the printing apparatus 100. Hence, processing to be explained below is comprehensively controlled by the CPU 201 of the printing apparatus 100.

In step S401, the CPU 201 receives an output request and requests the apparatus (in this case, the PC 140) of the output request transmission destination to set an output method as an output condition. Output methods include, for example, print output and display output. In step S402, the CPU 201 determines whether the output method setting has been executed. If the output method has been set, the process advances to step S403. If no method has been set, the determination in step S402 is periodically repeated.

When the output method has been set, the CPU 201 determines the set output method in step S403. If the output method is print output, the process advances to step S404. If the output method is display output, the process advances to step S407.

When the output method is print output, the CPU 201 analyzes, in step S404, image data received from the PC 140 via the interface control unit 207 and stored in the storage device (e.g., RAM 203 or mass storage 206). Alternatively, the CPU 201 analyzes image data received from the scanner unit 214 and stored in the storage device. The CPU 201 analyzes the layout of the image data stored in the storage device. The layout is appropriate to, for example, one of print output and display output.

In step S405, the CPU 201 determines based on the analysis result whether the image data stored in the storage device has an layout appropriate to printing (to be referred to as print data hereinafter). If the stored image data is print data, the process advances to step S409. If the data is not print data, the process advances to step S406.

When the stored image data is print data, the CPU 201 creates output data from the stored print data in step S409. In step S410, the CPU 201 determines the output destination. The CPU 201 determines here whether the output destination of the generated output data is an internal device (printer unit 217) or an external device (projector 120). For an internal device, the CPU 201 advances to step S411 to store the output data in the storage device. For an external device, the CPU 201 advances to step S412 to transmit the output data via the interface control unit 207.

On the other hand, upon determining in step S405 that the stored image data is not print data, the CPU 201 converts the stored image data into print data in step S406. The CPU 201 then executes the above-described processes in steps S409 to S412 using the converted print data.

Upon determining in step S403 that the set output method is display output, the process advances to step S407. The CPU 201 analyzes image data received from the PC 140 via the interface control unit 207 and stored in the storage device. Alternatively, the CPU 201 analyzes image data received from the scanner unit 214 and stored in the storage device. More specifically, the CPU 201 analyzes whether the image data stored in the storage device has an layout appropriate to display (to be referred to as display data hereinafter).

In step S408, the CPU 201 determines based on the analysis result whether the image data stored in the storage device is display data. If the stored image data is display data, the process advances to step S409. If the data is not display data, the process advances to step S406. The process from step S406 or S409 is the same as the above-described process executed when the output method is print output, and a description thereof will not be repeated.

Figure 5:
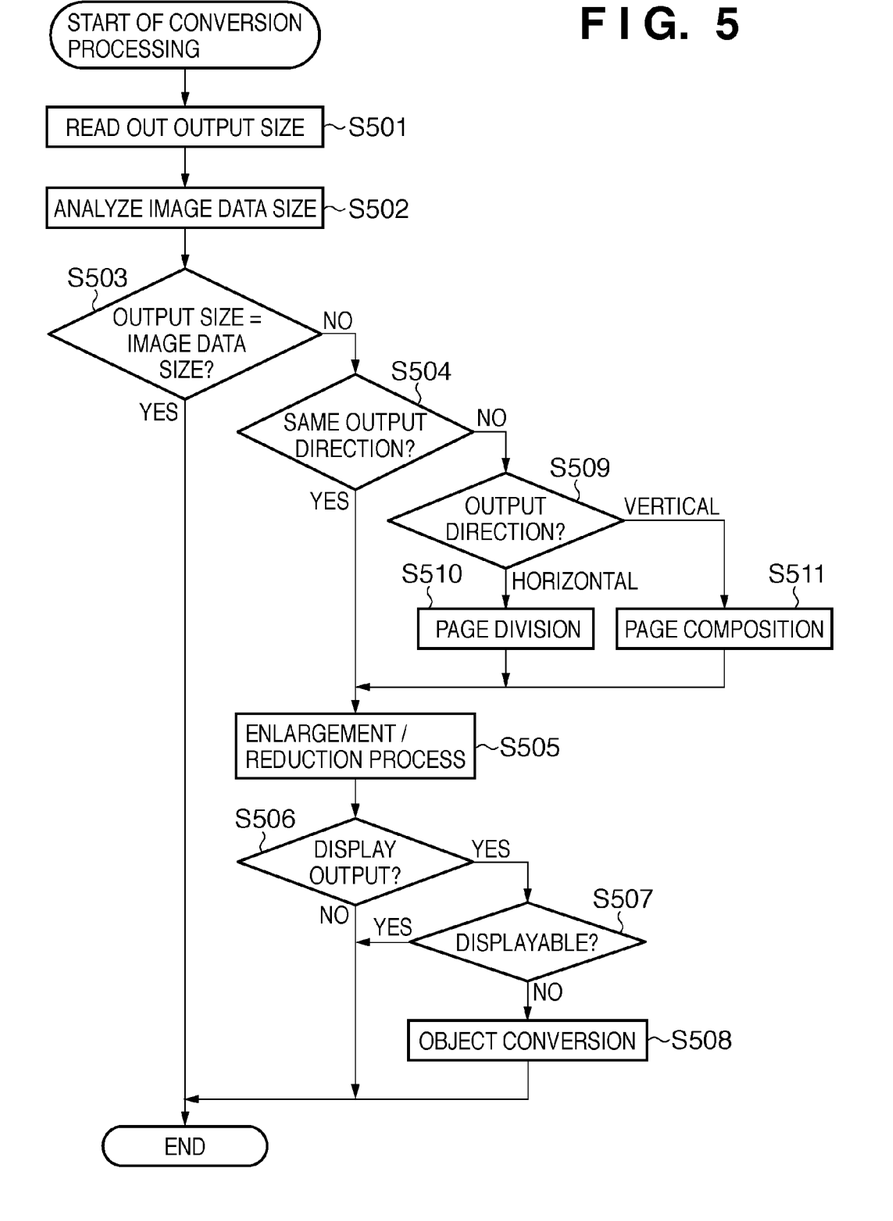
FIG. 5 is a flowchart illustrating the processing procedure of output data conversion processing according to the first embodiment.

Details of conversion processing in step S406 of FIG. 4 will be described next with reference to FIG. 5. FIG. 5 is a flowchart illustrating the processing procedure of output data conversion processing according to the first embodiment. Processing to be explained below is comprehensively controlled by the CPU 201 of the printing apparatus 100.

In step S501, the CPU 201 reads out the output size of output data from the output conditions added to the output request. In step S502, the CPU 201 analyzes the output size when the image data stored in the storage device (RAM 203 or mass storage 206) is output.

In step S503, the CPU 201 compares the output size of the output condition with the output size of the image data, and determines based on the comparison result whether the output sizes equal. If the output sizes equal, the processing ends. If the output size of the output condition and that of the image data are different, the process advances to step S504.

In step S504, the CPU 201 determines whether the output direction included in the output conditions is the same as the output direction of the image data. More specifically, the CPU 201 determines whether the output direction is "vertical" or "horizontal". If the output directions equal, the process advances to step S505. If the directions are different, the process advances to step S509.

In step S505, the CPU 201 executes an enlargement process or a reduction process to adjust the output size. After the enlargement/reduction process, the CPU 201 determines in step S506 whether the image data is display output data. If the image data is not display output data, the processing ends. If the image data is display output data, the process advances to step S507. In step S507, the CPU 201 determines whether the data is displayable on the output target display. If the data is displayable, the processing ends. If the data is not displayable, the process advances to step S508. In step S508, the CPU 201 converts undisplayable objects. For example, the CPU 201 determines in step S507 that a character object of 10 point or less is undisplayable. In this case, in step S508, processing of converting the character object to a size larger than 10 point is performed to make the object displayable.

On the other hand, upon determining in step S504 that the output direction of the output condition and that of the image data are different, the CPU 201 determines the output direction of the output condition in step S509. If the output direction is "horizontal", the process advances to step S510. If the output direction is "vertical", the process advances to step S511.

Figure 6:
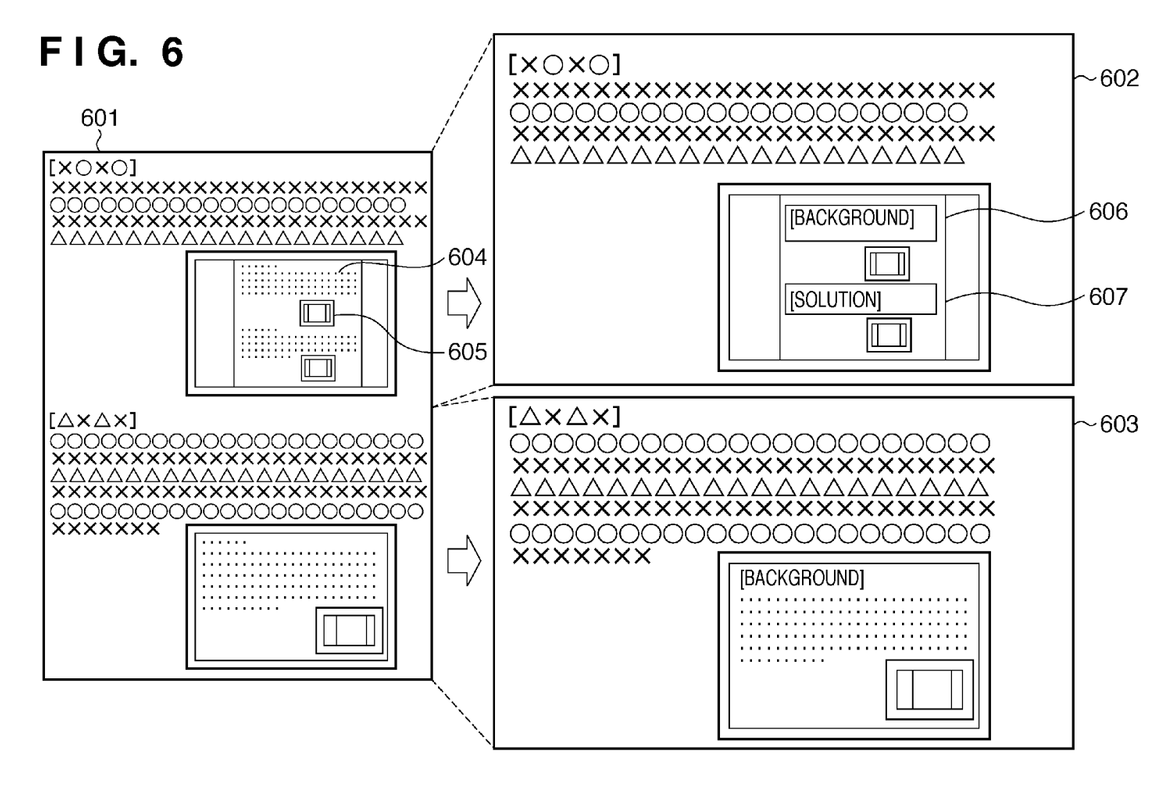
FIG. 6 is a view for explaining print data and output data according to the first embodiment.

In step S510, for example, the CPU 201 divides the page of an image data image 601 (vertical) laid out in correspondence with the image data into output data images 602 and 603 of two pages, as shown in FIG. 6. Subsequently, the process advances to step S505 to execute the same process as that executed when the output direction of the output condition and that of the image data equal. FIG. 6 is a view for explaining image data and output data according to the first embodiment. FIG. 6 illustrates an example in which the output direction of the image data is "vertical", and the output direction of the output condition is "horizontal". Reference numeral 601 denotes an image data image; 602 and 603, output data images; 604 and 605, character objects in the image data; and 606 and 607, character objects after the enlargement/reduction process in step S505. As shown in FIG. 6, the character objects 606 and 607 indicate a state in which the characters of the character objects 604 and 605 are deleted because the frames cannot contain all of them after the enlargement process. A solution to this will be described later with reference to FIG. 8.

Figure 7:
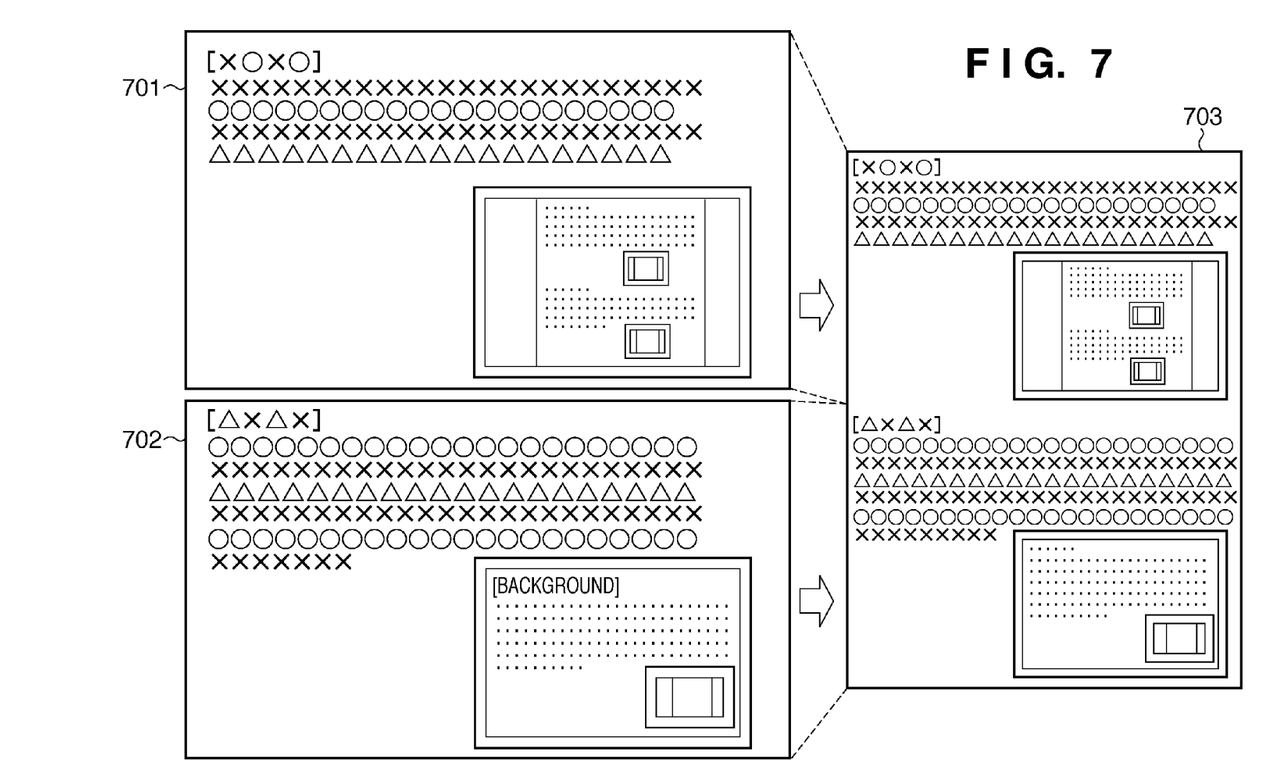
FIG. 7 is a view for explaining print data and output data according to the first embodiment.

In step S511, for example, the CPU 201 composes image data images 701 and 702 (horizontal) laid out on a plurality of pages in correspondence with the image data into an output image 703 of one page, as shown in FIG. 7. Subsequently, the process advances to step S505 to execute the same process as that executed when the output direction of the output condition and that of the image data equal. FIG. 7 is a view for explaining image data and output data according to the first embodiment. FIG. 7 illustrates an example in which the output direction of the image data is "horizontal", and the output direction of the output condition is "vertical". Reference numerals 701 and 702 denote image data images; and 703, an output data image.

Figure 8:
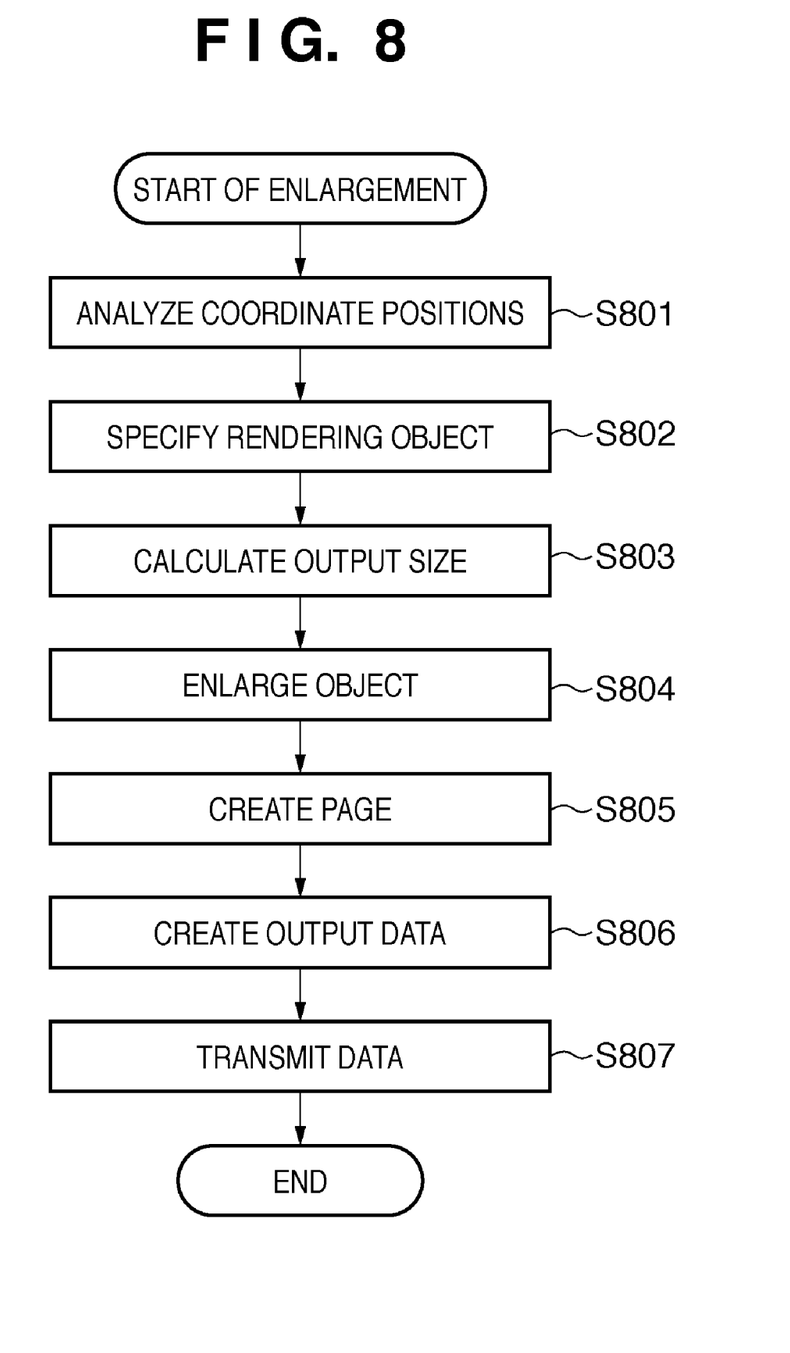
FIG. 8 is a flowchart illustrating the output data creation procedure of an enlargement process according to the first embodiment.

Processing for an enlargement request from the display apparatus will be described next with reference to FIG. 8. FIG. 8 is a flowchart illustrating the output data creation procedure of the enlargement process according to the first embodiment. Processing to be explained below is comprehensively controlled by the CPU 201 of the printing apparatus 100.

In step S801, the CPU 201 receives, via the interface control unit 207, an enlargement request to enlarge the image of a partial region, and analyzes the enlargement coordinate positions based on the information of the enlargement request. In step S802, the CPU 201 specifies, based on the enlargement coordinate positions, a rendering object that is the enlargement target in the image. In step S803, the CPU 201 calculates the output size.

In step S804, the CPU 201 enlarges the object in accordance with the rendering object information and the output size information. In step S805, the CPU 201 creates the page. In step S806, the CPU 201 creates output data. In step S807, the CPU 201 transmits the created output data to the device (e.g., projector 120) of the enlargement request source.

Figure 9:
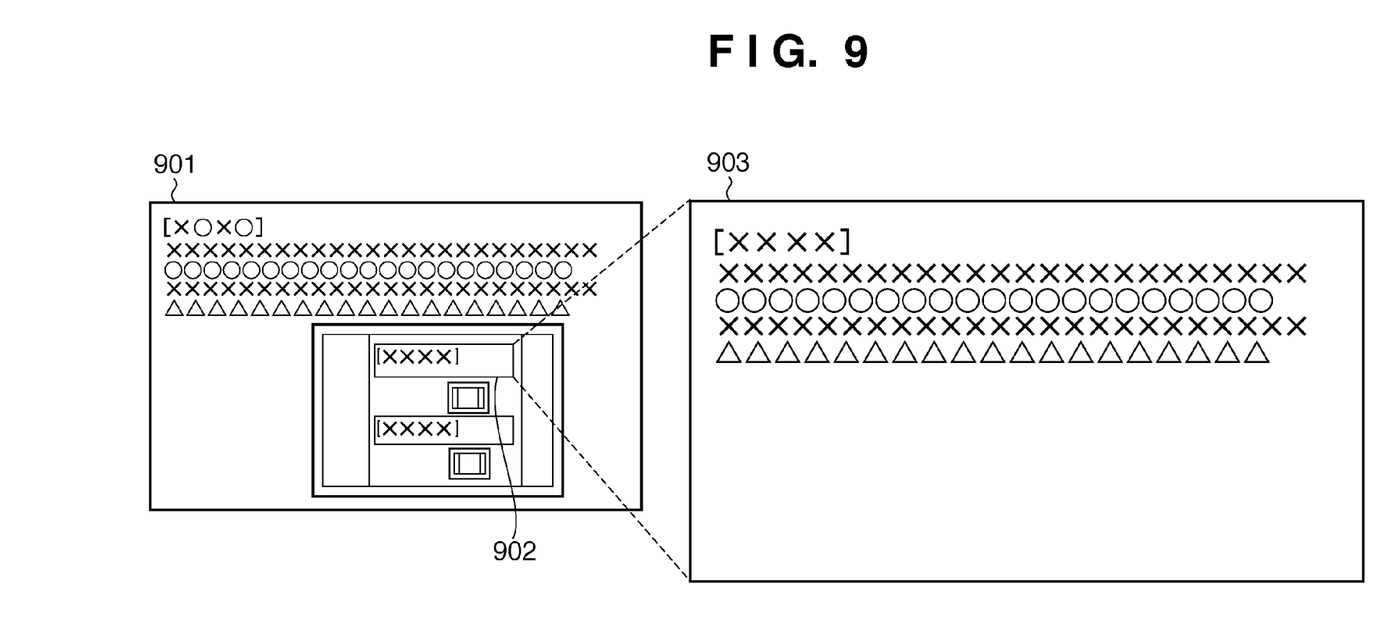
FIG. 9 is a view for explaining the enlargement process for an enlargement request according to the first embodiment.

FIG. 9 is a view for explaining the enlargement process for an enlargement request according to the first embodiment. Reference numeral 901 denotes a display image; 902, an enlargement designated region in the display image 901; and 903, an enlarged image. As shown in FIG. 9, the enlargement process in FIG. 8 creates output data by enlarging the enlargement designated region designated by the enlargement request.

<Display Control to Projector>

Figure 10:
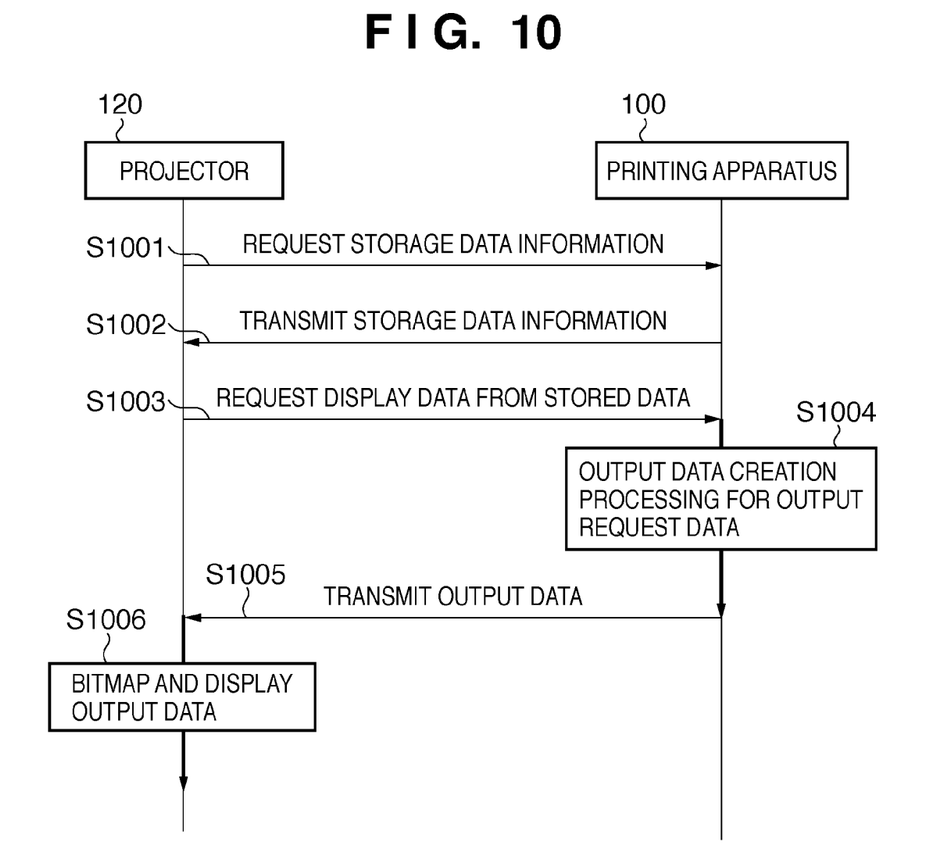
FIG. 10 is a sequence chart showing communication between the printing apparatus 100 and the projector 120 according to the first embodiment.

Display control from the printing apparatus 100 to the projector 120 will be described next with reference to FIG. 10. FIG. 10 is a sequence chart showing communication between the printing apparatus 100 and the projector 120 according to the first embodiment. As shown in FIG. 1, the printing apparatus 100 and the projector 120 are connected via the LAN 150 to transfer data between them.

First in step S1001, the projector 120 transmits a storage data information request to the printing apparatus 100. More specifically, the user who makes a presentation directly designates a file or searches for a file based on a keyword using a remote controller dedicated to the projector or the operation unit of the projector, thereby requesting storage data information. The storage data information need not always contain a single file but may include a list of a plurality of files.

In step S1002, the printing apparatus 100 transmits the storage data information to the projector 120. More specifically, the printing apparatus 100 transmits the file name or file list designated by the user. The projector 120 then displays, on the screen of the operation unit of the projector or on the screen 130 on which the projector is projecting data, the file name or file list as a text or thumbnail. The user confirms the file name or file list displayed on the screen 130 and selects a file to be displayed by the projector 120 using the remote controller dedicated to the projector or the operation unit of the projector. After selection by the user, the projector 120 transmits a display data request to the printing apparatus 100 in step S1003.

Upon receiving the display data request from the projector 120, the printing apparatus 100 executes processing of generating output data of the display-requested data in step S1004. At this time, optimum output data is generated in accordance with the output device that displays the data, as described with reference to FIG. 4. In this example, the data is transmitted to the projector 120. Hence, the output method is display output, and the output data of display data is generated. After generating the output data, the printing apparatus 100 transmits it to the projector 120 in step S1005.

Upon receiving the output data, the rendering unit 309 of the projector 120 bitmaps it and transmits the bitmapped output data to the display unit 310 in step S1006. The display unit 310 projects the image onto the screen 130 in accordance with the output data.

Figure 11:
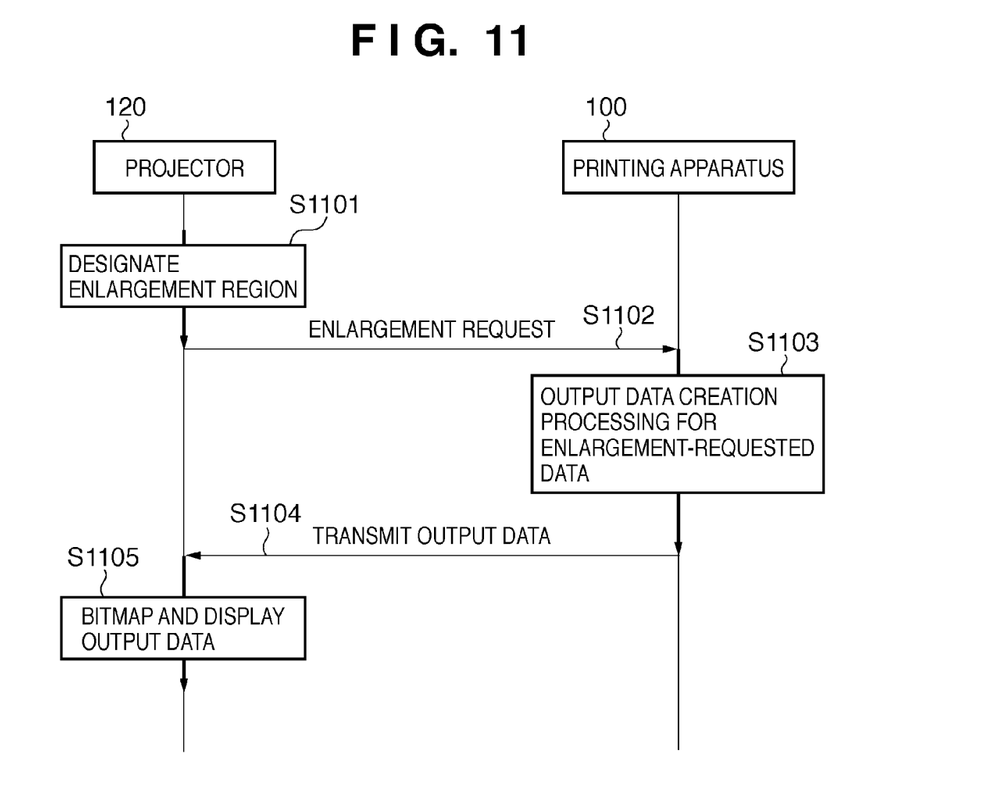
FIG. 11 is a sequence chart showing communication between the printing apparatus 100 and the projector 120 according to the first embodiment.

Control of the projector 120 when transmitting an enlargement request to the printing apparatus 100 will be described next with reference to FIG. 11. FIG. 11 is a sequence chart showing communication between the printing apparatus 100 and the projector 120 according to the first embodiment.

In step S1101, the projector 120 designates, in display data received from the printing apparatus 100 in accordance with the sequence of FIG. 10, a region as the target of an enlargement request to enlarge the image of the partial region. In step S1102, the projector 120 transmits, to the printing apparatus 100, an enlargement request added with information representing the designated enlargement region.

Upon receiving the enlargement request, the printing apparatus 100 executes in step S1103 the processing of creating output data for the enlargement request, which has been described with reference to the flowchart in FIG. 8. After creating the output data, the printing apparatus 100 transmits it to the projector 120 in step S1104.

Upon receiving the output data, the rendering unit 309 of the projector 120 bitmaps it and transmits the bitmapped output data to the display unit 310 in step S1105. The display unit 310 projects the image onto the screen 130 in accordance with the output data.

As described above, the image processing apparatus according to this embodiment creates, from stored image data, output data complying with the output method. When the layout of the stored image data is not appropriate to the output method, the image processing apparatus performs the conversion process. This allows the image processing apparatus to obviate the need for storing image data corresponding to each layout and create output data of various types from single image data. Hence, the image processing apparatus can decrease the number of stored image data and effectively use the memory resource.

Second Embodiment

Figure 12:
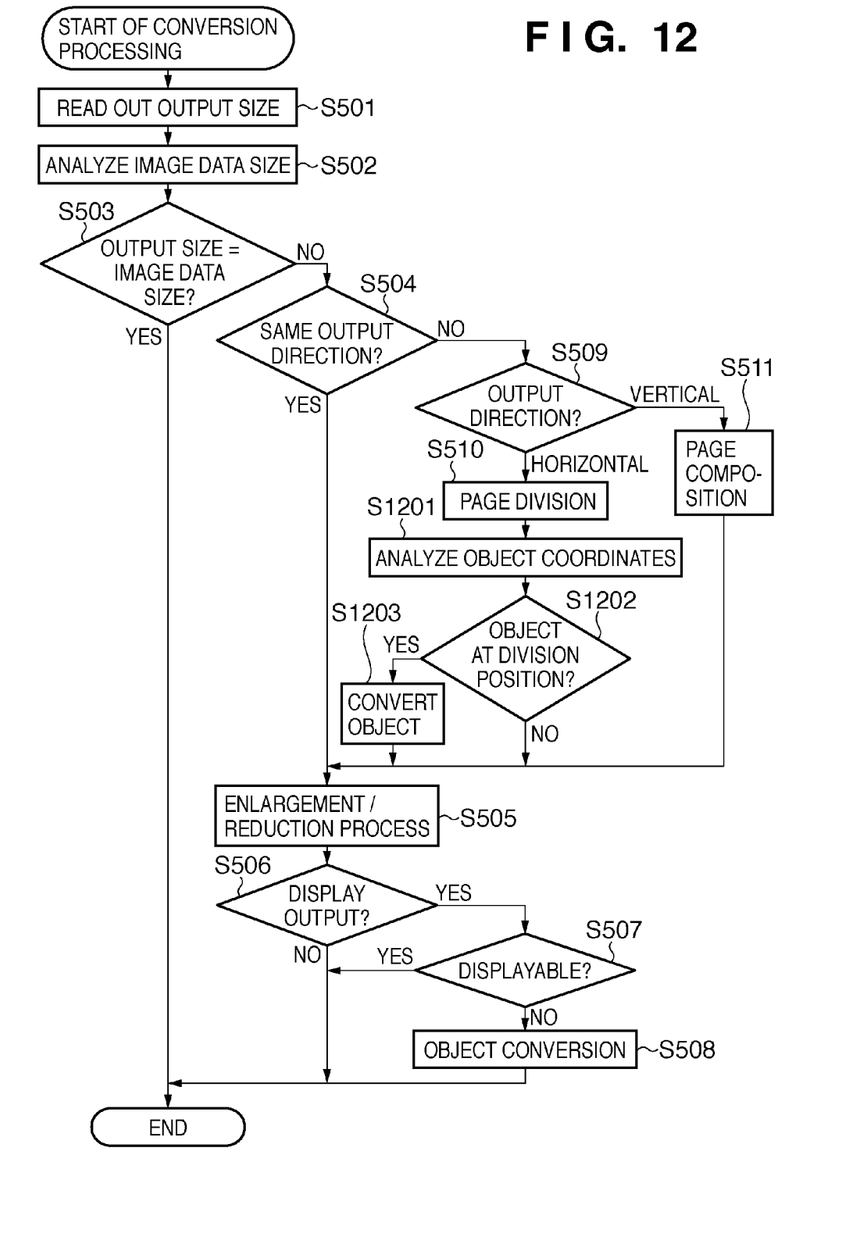
FIG. 12 is a flowchart illustrating the processing procedure of output data conversion processing according to the second embodiment.

The second embodiment will be described next with reference to FIGS. 12 and 13. In the first embodiment, an example has been explained in which page division is simply performed in accordance with the output data condition. As a characteristic feature of the second embodiment, when executing page division, an object that exists at the division position is converted.

Output data conversion processing according to this embodiment will be described first with reference to FIG. 12. FIG. 12 is a flowchart illustrating the processing procedure of output data conversion processing according to the second embodiment. Processing to be explained below is comprehensively controlled by a CPU 201 of a printing apparatus 100. Note that only processes different from the flowchart of FIG. 5 will be described here. The same step numbers as in the flowchart of FIG. 5 denote the same processes, and a description thereof will not be repeated.

When the output direction is "horizontal" in step S509, the CPU 201 performs page division in step S510. According to this embodiment, the CPU 201 performs object analysis in step S1201 to determine whether an object exists at the division position of the page division processing. This object analysis is performed for all objects.

In step S1202, the CPU 201 determines based on the result of object analysis whether an object exists at the division position. If an object exists at the division position, the process advances to step S1203. If no object exists, the process advances to step S505, as in the flowchart of FIG. 5.

In step S1203, the CPU 201 executes object conversion processing. The object conversion processing will be explained with reference to FIG. 13. FIG. 13 is a view for explaining page division processing according to the second embodiment. Reference numeral 1301 denotes a print data image; 1302 and 1303, output data images; and 1304 and 1305, objects.

Figure 13:
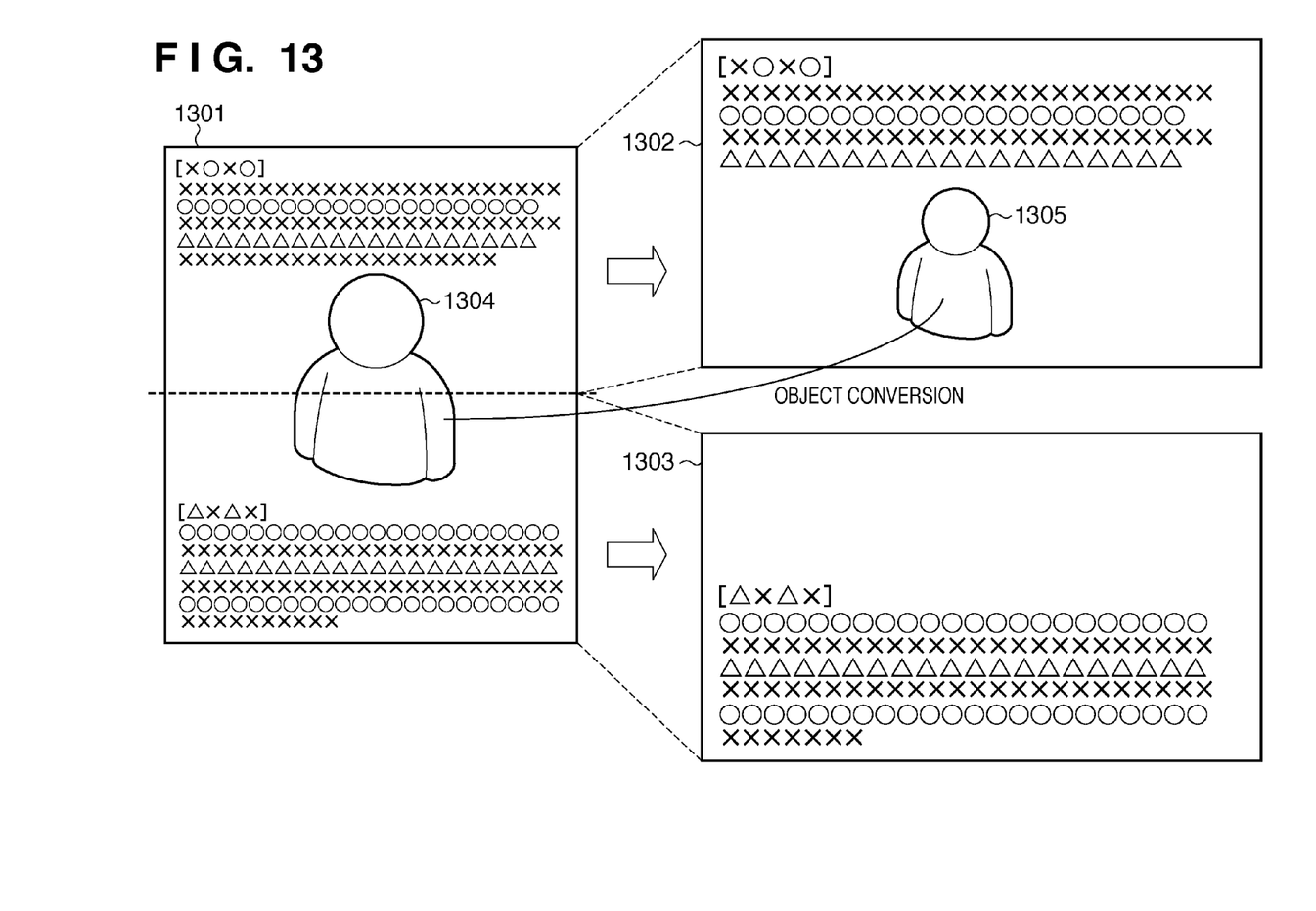
FIG. 13 is a view for explaining page division processing according to the second embodiment.

In the example of FIG. 13, when dividing the page of the print data image 1301, the object 1304 exists at the division position, and it is necessary to convert the object 1304 at the division position. According to this embodiment, in the object conversion processing, output data is created by, for example, adding the reduced object 1305 to the output data image 1302 and deleting the object 1304 from the output data image 1303. That is, the object that exists at the division position is laid out in one of the divided pages.

As described above, when creating output data complying with the output condition, the image processing apparatus according to this embodiment reduces an object that exists at the division position of page division and adds it to one of the divided pages. Hence, the image processing apparatus can prevent an object from being divided according to the output method.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-039832 filed on Feb. 23, 2009, which is hereby incorporated by reference herein in its entirety.

What is claimed is:

1. An image processing apparatus for outputting image data in accordance with requested output conditions, comprising:
   a storage unit that stores image data as a target of image processing;
   a determination unit that, when outputting the image data stored in said storage unit, determines whether an output method included in the output conditions indicates print output or display output, and determines whether or not a layout of the image data stored in said storage unit is appropriate for the determined output method;
   a conversion unit that, if said determination unit has determined that the layout of the image data stored in said storage unit is not appropriate for the determined output method, converts the image data into a layout appropriate for the determined output method; and
   a transmission unit that transmits the image data converted by said conversion unit to an output device corresponding to the output method included in the output conditions.

2. The apparatus according to claim 1, wherein said conversion unit comprises:
   a unit that compares an output size upon outputting the image data stored in said storage unit with an output size included in the output conditions; and
   an enlargement/reduction unit that, when the output size of the image data and the output size of the output condition are different, executes one of an enlargement process and a reduction process of the image data so as to make the output size of the image data equal to the output size of the output condition.

3. The apparatus according to claim 1, wherein said conversion unit comprises:
   a unit that compares an output direction upon outputting the image data stored in said storage unit with an output direction included in the output conditions;
   a division unit that divides a page laid out in correspondence with the image data when the output direction of the image data and the output direction of the output condition are different, and the output direction of the output condition indicates horizontal; and a composition unit that composites a plurality of pages laid out in correspondence with the image data when the output direction of the image data and the output direction of the output condition are different, and the output direction of the output condition indicates vertical.

4. The apparatus according to claim 3, wherein said division unit comprises:
   a unit that determines whether or not an object exists at a division position where the page laid out in correspondence with the image data is to be divided; and
   a unit that, if the object exists, lays out, in one of divided pages, the object that exists at the division position.

5. The apparatus according to claim 4, wherein said division unit further comprises a unit that reduces an output size of the object when laying out the object that exists at the division position.

6. The apparatus according to claim 1, wherein said conversion unit comprises:
   a unit that, when the output method indicates display output, determines whether or not the image data converted by said conversion unit is displayable on the output device; and
   a unit that, when the converted image data is not displayable, converts an object included in the converted image data so as to make the object displayable.

7. The apparatus according to claim 1, further comprising:
   a reception unit that receives, from a display apparatus connected via a network, an enlargement request to enlarge an image of a partial region concerning the image data transmitted by said transmission unit;
   a specifying unit that, upon receiving the enlargement request, specifies an object in the enlargement target image based on information of the enlargement request; and
   a generation unit that generates image data by enlarging the specified object.

8. A method of controlling an image processing apparatus for outputting image data in accordance with requested output conditions, the apparatus including a storage unit that stores image data as a target of image processing, comprising:
   when outputting the image data stored in the storage unit, determining whether an output method included in the output conditions indicates print output or display output, and determining whether or not a layout of the image data stored in the storage unit is appropriate for the determined output method;
   if it is determined in the determining that the layout of the image data stored in the storage unit is not appropriate for the determined output method, converting the image data into a layout appropriate for the determined output method; and
   transmitting the image data converted in the converting to an output device corresponding to the output method included in the output conditions.

9. A non-transitory computer-readable storage medium storing a computer program that causes a computer to execute an image processing apparatus control method of claim 8.

* * * * *